United States Patent
Saelee et al.

(10) Patent No.: US 10,571,163 B2
(45) Date of Patent: Feb. 25, 2020

(54) THERMOELECTRIC HEAT PUMP TYPE AIR CONDITIONER

(71) Applicant: ZHEJIANG JIAXI OPTOELECTRONIC EQUIPMENT MANUFACTURING CO., LTD., Jiashan, Zhejiang (CN)

(72) Inventors: Cheechiang Saelee, Zhejiang (CN); Jianzhong Zhang, Zhejiang (CN)

( * ) Notice: Subject to any disclaimer, the term of this patent is extended or adjusted under 35 U.S.C. 154(b) by 0 days.

(21) Appl. No.: 15/739,995

(22) PCT Filed: May 19, 2016

(86) PCT No.: PCT/CN2016/082590
§ 371 (c)(1),
(2) Date: Dec. 27, 2017

(87) PCT Pub. No.: WO2017/166394
PCT Pub. Date: Oct. 5, 2017

(65) Prior Publication Data
US 2019/0072300 A1    Mar. 7, 2019

(30) Foreign Application Priority Data
Apr. 1, 2016 (CN) .......................... 2016 1 0206935

(51) Int. Cl.
*F25B 21/02* (2006.01)
*F25B 21/04* (2006.01)
(Continued)

(52) U.S. Cl.
CPC ............ *F25B 25/00* (2013.01); *F24F 5/0042* (2013.01); *F25B 21/02* (2013.01); *F25B 21/04* (2013.01);
(Continued)

(58) Field of Classification Search
CPC ...... F25B 21/02; F25B 21/04; F25B 2321/02; H05K 2201/10219; F28D 15/02;
(Continued)

(56) References Cited

U.S. PATENT DOCUMENTS 3,018,087 A * 1/1962 Steele ..................... F25D 23/06
                                                        165/104.21
3,451,904 A * 6/1969 Jaremus .................. H01L 35/34
                                                        136/201
(Continued)

FOREIGN PATENT DOCUMENTS

| CN | 102401506 A | 4/2012 |
|---|---|---|
| CN | 105371532 A | 3/2013 |

(Continued)

*Primary Examiner* — Frantz F Jules
*Assistant Examiner* — Erik Mendoza-Wilkenfel
(74) *Attorney, Agent, or Firm* — Global IP Services; Tianhua Gu

(57) ABSTRACT

A thermoelectric heat pump air conditioner comprising an indoor air conditioner and an outdoor air conditioner. The indoor air conditioner comprises a first phase-change suppressing heat transfer plate, a thermoelectric cooling assembly and a heat exchanger. A first cooling medium pipe and a first thermally superconducting pipe are formed in the first phase-change suppressing heat transfer plate. The first thermal superconducting pipe is filled with a first heat transfer working medium. The heat exchanger is attached on a surface, away from the phase-change suppressing heat transfer plate, of the thermoelectric cooling assembly. A second cooling medium pipe is formed in the heat exchanger. The outdoor air conditioner comprises a second phase-change suppressing heat transfer plate. A third cooling medium pipe and a second thermally superconducting pipe are formed in the second phase-change suppressing heat transfer plate.

(Continued)

The second thermally superconducting pipe is filled with a second heat transfer working medium.

18 Claims, 7 Drawing Sheets

(51) Int. Cl.
```
F28D 15/02      (2006.01)
F25B 39/02      (2006.01)
F25B 25/00      (2006.01)
F28F 3/14       (2006.01)
F24F 5/00       (2006.01)
F25B 41/06      (2006.01)
F25B 43/00      (2006.01)
F25B 13/00      (2006.01)
```
(52) U.S. Cl.
CPC ............ *F25B 39/024* (2013.01); *F25B 41/06* (2013.01); *F25B 43/003* (2013.01); *F28F 3/14* (2013.01); *F25B 13/00* (2013.01); *F25B 2321/023* (2013.01); *F25B 2321/025* (2013.01); *F25B 2500/01* (2013.01); *F25B 2500/02* (2013.01); *Y02B 30/72* (2013.01)

(58) Field of Classification Search
CPC ............ F28D 15/0233; F28D 15/0266; F28D 15/0275; F28D 9/0031; F28D 9/0037; F28D 9/005; F28D 9/0056
See application file for complete search history.

(56) References Cited

U.S. PATENT DOCUMENTS

| | | | |
|---|---|---|---|
| 2006/0288729 A1* | 12/2006 | Arjomand | F24F 1/027 62/441 |
| 2008/0083445 A1* | 4/2008 | Chakraborty | H01L 35/30 136/205 |
| 2012/0304667 A1* | 12/2012 | Shin | F25B 21/02 62/3.6 |
| 2013/0014796 A1* | 1/2013 | Tajima | H01L 35/08 136/203 |
| 2013/0077245 A1* | 3/2013 | Gradinger | F28D 1/035 361/700 |

FOREIGN PATENT DOCUMENTS

| | | |
|---|---|---|
| CN | 105004205 A | 10/2015 |
| KR | 20120132018 A | 12/2012 |
| WO | WO 2011161043 A1 | 12/2011 |

* cited by examiner

THERMOELECTRIC HEAT PUMP TYPE AIR CONDITIONER

CROSS REFERENCE TO RELATED PATENT APPLICATION

The present application is the U.S. national stage of PCT/CN2016/082590 filed on May 19, 2016, which claims the priority of the Chinese patent application No. CN201610206935.4 filed on Apr. 1, 2016, which application is incorporated herein by reference.

TECHNICAL FIELD

The present invention relates to the field of household appliances, and in particular to a thermoelectric heat pump air conditioner.

BACKGROUND

An air conditioning unit is an air conditioning appliance used for directly providing processed air to a closed room, space or area, which is generally referred to as an air conditioner. Split-type heat pump air conditioners that are currently and massively produced and applied use compressors as heat pumps, and the structure thereof is shown in FIG. 1. As shown in FIG. 1, it can be known that the heat pump air conditioner comprises an indoor air conditioner 10, a compressor 11, a first dryer 12, a second dryer 13, a first throttle 14, a second throttle 15, a first one-way valve 16, a second one-way valve 17, a four-way reversing valve 18 and an outdoor air conditioner 19. The indoor air conditioner 10 comprises an evaporator/condenser 101 and a cross-flow blower 102. The outdoor air conditioner 19 comprises a condenser/evaporator 191 and an axial blower 192. The first throttle 14, the first dryer 12, the second dryer 13, and the second throttle 15 are sequentially connected in series. One end of the first throttle 14 away from the first dryer 12 is interconnected with one end of the evaporator/condenser 101. One end of the second throttle 15 away from the second dryer 13 is interconnected with one end of the condenser/evaporator 191. One end of the first one-way valve 16 is interconnected with one end of the first throttle 14 away from the first dryer 12, and another end is interconnected with one end of the first dryer 12 away from the first throttle 14. One end of the second one-way valve 17 is interconnected with one end of the second dryer 13 away from the second throttle 15, and another end is interconnected with one end of the second throttle 15 away from the second dryer 13. The four-way reversing valve 18 comprises four connection ends (1), (2), (3) and (4) The connection ends (1) and (3) are connected with the compressor 11, the connection end (2) is connected with another end of the evaporator/condenser 101, and the connection end (4) is connected with another end of the condenser/evaporator 191. The cross-flow blower 102 is connected between the evaporator/condenser 101 and the connection end (2), and the axial blower 192 is located at one side of the condenser/evaporator 191. The operating principles of the heat pump air conditioner according to the present invention are as follows.

During cooing, the connection ends (1) and (4) of the four-way reversing valve 18 are interconnected with each other, and the connection ends (2) and (3) are interconnected with each other. Low temperature and low pressure refrigerant gas is sucked by the compressor 11, is then compressed to be high pressure and high temperature gas, is then discharged to the condenser/evaporator 191, and is then cooled by cold air discharged from the axial blower 192. By such a process, the high pressure and high temperature gas in the condenser/evaporator 191 is condensed into liquid. The liquid then flows through the second one-way valve 17 to the first dryer 12 and the first throttle 14 and becomes low pressure and low temperature liquid for entering into the evaporator/condenser 101 and then being vaporized. Heat of indoor air sucked due to operation of the axial blower 102 is sucked to cool the indoor air, and the cooled indoor air is returned back to the room via an air passage under the effect of the axial blower 102.

During heating, the connection ends (1) and (2) of the four-way reversing valve 18 are interconnected with each other, and the connection ends (3) and (4) are interconnected with each other. Low temperature and low pressure refrigerant gas is sucked by the compressor 11, is then compressed to be high pressure and high temperature gas, is then discharged to the evaporator/condenser 101, and is then discharged by the axial blower 102 for heating indoor cool air. By such a process, the high pressure and high temperature gas in the evaporator/condenser 101 is condensed into liquid. The liquid then flows through the first one-way valve 16 to the second dryer 13 and the second throttle 15 and becomes low pressure and low temperature liquid for entering into the condenser/evaporator 191 and then being vaporized. The function of the four-way reversing valve 18 is that: when the flow direction of the refrigerant in the system is opposite to the direction during cooling, the condenser/evaporator 191 absorbs heat in the air, and the evaporator/condenser 101 releases the heat to realize heating at an indoor side, such that temperature of the air in the room is increased.

Currently, in our country, the environmental temperature during operation of the heat pump air conditioner is generally between −7° C. to 43° C., and the environmental temperature during operation of the heat pimp air conditioner under a tropical environment can be even −7° C. to 52° C. However, a coefficient of performance of the existing heat pump air conditioner is relatively low during operation at a lower or higher environmental temperature, especially, during low-temperature heating. The compressor has to be shut down when a surface of the evaporator of the outdoor air conditioner is frozen. The compressor can be restarted and operated only when the frost is cleaned, which influences the popularization and use of the heat pump air conditioner in cold areas.

Besides, evaporators and condensers (and the above-mentioned evaporator/condenser 101 and condenser/evaporator 191) sold in the market today use the form of a sleeve structure. That is, an aluminum fin is sleeved on a copper tube, and then a heat dissipation aluminum fin closely rests against the cooper tube through a mechanical expansion tube or a hydraulic expansion tube. The aluminum fin is used to increase a heat exchange area and the heat transfer coefficient at an air side of the heat exchanger, thereby increasing the heat exchange amount of the heat exchanger. However, thermal resistance between this structural type of heat exchanger copper tube and the aluminum fin is larger, and the heat transfer coefficient is low. Moreover, the indoor air conditioner and the outdoor air conditioner are larger in volume and are relatively heavy.

SUMMARY

In order to solve the defects in the prior art, the present invention provides a thermoelectric heat pump air conditioner for solving problems in the prior art that a heat pump air conditioner has a low coefficient of performance during heating at a low temperature, has a smaller temperature range of an operating environment, cannot be applied and used in cold areas, and has a large volume and is relatively heavy.

In order to realize the above objects and other related objects, the present invention provides a thermoelectric heat pump air conditioner comprising an indoor air conditioner and an outdoor air conditioner.

The indoor air conditioner comprises a first phase-change suppressing heat transfer plate, a thermoelectric cooling assembly and a heat exchanger; a first cooling medium pipe having a certain configuration and a first thermally superconducting pipe having a certain configuration are formed in the first phase-change suppressing heat transfer plate; the first thermally superconducting pipe is filled with a first heat transfer working medium; one face of the thermoelectric cooling assembly is attached on a surface of the phase-change suppressing heat transfer plate; the heat exchanger is attached on a surface, away from the phase-change suppressing heat transfer plate, of the thermoelectric cooling assembly; a second cooling medium pipe is formed in the heat exchanger; and one end of the second cooling medium pipe is interconnected with one end of the first cooling medium pipe.

The outdoor air conditioner comprises a second phase-change suppressing heat transfer plate; a third cooling medium pipe having a certain shape and a second thermally superconducting pipe having a certain configuration are formed in the second phase-change suppressing heat transfer plate, and the second thermally superconducting pipe is filled with a second heat transfer working medium.

As a preferred solution of the thermoelectric heat pump air conditioner according to the present invention, the first thermally superconducting pipe, the second thermally superconducting pipe, the first cooling medium pipe and the third cooling medium pipe are formed through an inflation process.

As a preferred solution of the thermoelectric heat pump air conditioner according to the present invention, each of the first phase-change suppressing heat transfer plate and the second phase-change suppressing heat transfer plate comprises a first plate and a second plate which are composited together through a rolling process.

The first thermally superconducting pipe and the first cooling medium pipe, or the second thermally superconducting pipe and the third cooling medium pipe are located between the first plate and the second plate; a surface of the first plate, a surface of the second plate, or the surfaces of the first plate and the second plate are formed with a first projection structure corresponding to the first thermally superconducting pipe or the second thermally superconducting pipe, and a second projection structure corresponding to the first cooling medium pipe or the third cooling medium pipe.

As a preferred solution of the thermoelectric heat pump air conditioner according to the present invention, each of the first phase-change suppressing heat transfer plate and the second phase-change suppressing heat transfer plate comprises the first plate, the second plate and a third plate which are successively stacked; the first plate and the third plate are located on two sides of the second plate respectively and are composited with the second plate through the rolling process.

The first thermally superconducting pipe or the second thermally superconducting pipe is located between the first plate and the second plate; the surface of the first plate is formed with the first projection structure corresponding to the first thermally superconducting pipe or the second thermally superconducting pipe.

The first cooling medium pipe or the third cooling medium pipe is formed between the second plate and the third plate; and a surface of the third plate is formed with the second projection structure corresponding to the first cooling medium pipe or the third cooling medium pipe.

As a preferred solution of the thermoelectric heat pump air conditioner according to the present invention, each of the first phase-change suppressing heat transfer plate and the second phase-change suppressing heat transfer plate comprises the first plate, the second plate and the third plate which are successively stacked; the first plate and the third plate are located on the two sides of the second plate respectively and are composited with the second plate through the rolling process.

The first thermally superconducting pipe or the second thermally superconducting pipe is located between the first plate and the second plate; an outer surface of the first plate is a plane; and the surface of the second plate is formed with the first projection structure corresponding to the first thermally superconducting pipe or the second thermally superconducting pipe.

The first cooling medium pipe or the third cooling medium pipe is formed between the second plate and the third plate; and the surface of the third plate is formed with the second projection structure corresponding to the first cooling medium pipe or the third cooling medium pipe.

As a preferred solution of the thermoelectric heat pump air conditioner according to the present invention, each of the first phase-change suppressing heat transfer plate and the second phase-change suppressing heat transfer plate comprises the first plate, the second plate, the third plate and a fourth plate which are successively stacked; and the first plate, the second plate, the third plate and the fourth plate are composited together through the rolling process.

The third plate comprises a projection area, and the surface thereof is a plane.

The first thermally superconducting pipe or the second thermally superconducting pipe is located between the first plate and the third plate, and an area in which the first thermally superconducting pipe or the second thermally superconducting pipe is distributed corresponds to the projection area.

The first cooling medium pipe or the third cooling medium pipe is located between the third plate and the fourth plate, and an area in which the first cooling medium pipe or the third cooling medium pipe is distributed corresponds to the projection area.

As a preferred solution of the thermoelectric heat pump air conditioner according to the present invention, each of the first thermally superconducting pipe and the second thermally superconducting pipe comprises several first channels, second channels, and connection through-holes.

The first channel is located between the first plate and the second plate; the second channel is located between the second plate and the third plate; and the connection through-hole penetrates through the second plate and enables the adjacent first and second channels to be interconnected with each other.

The surface of the second plate is formed with the first projection structure corresponding to the first channel and the second channel; and a surface of the fourth plate is formed with the second project structure corresponding to the first cooling medium pipe or the third cooling medium pipe.

As a preferred solution of the thermoelectric heat pump air conditioner according to the present invention, two adjacent first channels and two adjacent second channels are separated from each other; and the first channel and the second channel are staggered in parallel.

The connection through-hole is located at two ends of the first channel and the second channel, and enables two ends of the adjacent first and second channels to be interconnected with each other.

As a preferred solution of the thermoelectric heat pump air conditioner according to the present invention, the cross-sectional shapes of the first channel and the second channel are a trapezoid; the lengthwise cross-sectional shapes of the first channel and the second channel are a rectangle; and the shape of the connection through-hole is a circle or an ellipsoid.

As a preferred solution of the thermoelectric heat pump air conditioner according to the present invention, the first thermally superconducting pipe or the second thermally superconducting pipe is in a hexagonal honeycomb shape, a circular honeycomb shape, a quadrangular honeycomb shape, a plurality of U-shapes that are connected in series, diamonds, triangles and circular ring shapes, or any combination of any one or more of the above shapes.

As a preferred solution of the thermoelectric heat pump air conditioner according to the present invention, a surface of an attachment portion between the first phase-change suppressing heat transfer plate and the thermoelectric cooling assembly has a plane shape, and a surface of other portions of the first phase-change suppressing heat transfer plate is formed with a hole, a shallow groove, a projection, a loose-leaf window or a coverage coating for enhancing heat transfer.

As a preferred solution of the thermoelectric heat pump air conditioner according to the present invention, the number of the thermoelectric cooling assembly is one or more; and a plurality of the thermoelectric cooling assemblies are connected in series, in parallel, in parallel-series or in series-parallel.

As a preferred solution of the thermoelectric heat pump air conditioner according to the present invention, the thermoelectric cooling assembly comprises a plurality of thermoelectric monomers, and each of the thermoelectric monomers comprises a P-type thermoelectric element and an N-type thermoelectric element which are arranged in a parallel spaced apart manner; each of the P-type thermoelectric element and the N-type thermoelectric element comprises a first end surface and a second end surface; the first end surface of the P-type thermoelectric element and the first end surface of the N-type thermoelectric element are connected by an electrode; the second end surface of the P-type thermoelectric element and the second end surface of the N-type thermoelectric element in the thermoelectric monomer located at an adjacent side of the second end surface of the P-type thermoelectric element are connected by the electrode; and the second end surface of the N-type thermoelectric element and the second end surface of the P-type thermoelectric element in the thermoelectric monomer located at an adjacent side of the second end surface of the N-type thermoelectric element are connected by the electrode.

As a preferred solution of the thermoelectric heat pump air conditioner according to the present invention, the thermoelectric cooling assembly further comprises an electrical isolation structure which is respectively attached on an outer side of the electrode located on the first end surfaces of the P-type thermoelectric element and the N-type thermoelectric element and an outer side of the electrode located on the second end surfaces of the P-type thermoelectric element and the N-type thermoelectric element.

As a preferred solution of the thermoelectric heat pump air conditioner according to the present invention, materials of the P-type thermoelectric element and the N-type thermoelectric element are doped pseudo binary bismuth telluride and solid solution thereof, and pseudoternary bismuth telluride and solid solution thereof.

As a preferred solution of the thermoelectric heat pump air conditioner according to the present invention, exposed outer surfaces of the thermoelectric cooling assembly and the heat exchanger are covered with a heat-insulating material layer.

As a preferred solution of the thermoelectric heat pump air conditioner according to the present invention, the indoor air conditioner further comprises a cross-flow blower; and the cross-flow blower is located at a side, opposite to or adjacent to one side at which the thermoelectric cooling assembly is installed, of the first phase-change suppressing heat transfer plate.

As a preferred solution of the thermoelectric heat pump air conditioner according to the present invention, the outdoor air conditioner further comprises an axial blower; and the axial blower is located at one side of the phase-change suppressing heat transfer plate in the outdoor air conditioner.

As a preferred solution of the thermoelectric heat pump air conditioner according to the present invention, the thermoelectric heat pump air conditioner further comprises an interconnection assembly, a four-way reversing valve and a compressor.

The communication assembly is located between the indoor air conditioner and the outdoor air conditioner with one end being interconnected with another end of the first cooling medium pipe in the indoor air conditioner and another end being interconnected with one end of the first cooling medium pipe in the outdoor air conditioner.

The four-way reversing valve is connected with another end of the second cooling medium pipe in the heat exchanger, the compressor and another end of the first cooling medium pipe in the outdoor air conditioner.

As a preferred solution of the thermoelectric heat pump air conditioner according to the present invention, the interconnection assembly comprises a first throttle, a second throttle, a first dryer, a second dryer, a first one-way valve and a second one-way valve.

The first throttle, the first dryer, the second dryer, and the second throttle are sequentially connected in series; one end of the first throttle, away from the first dryer, is interconnected with another end of the first cooling medium pipe in the indoor air conditioner; and one end of the second throttle, away from the second dryer, is interconnected with one end of the first cooling medium pipe in the outdoor air conditioner.

One end of the first one-way valve is interconnected with one end of the first throttle that is away from the first dryer, and another end is interconnected with one end of the first dryer that is away from the first throttle; one end of the second one-way valve is interconnected with one end of the second dryer that is away from the second throttle, and another end is interconnected with one end of the second throttle that is away from the second dryer.

As described above, the thermoelectric heat pump air conditioner according to the present invention has the following benefits:

(1) The thermoelectric cooling assembly, which is used as an auxiliary heat pump, may increase the range of a temperature environment in which the thermoelectric cooling assembly can normally operate from −10° C. to 60° C., and it has a higher coefficient of performance when operating at a high temperature and a low temperature.

(2) By using the phase-change suppressing heat transfer plate as an evaporator and a condenser, the heat transfer efficiency is high, and the thermoelectric heat pump air conditioner has a higher coefficient of performance within the expanded environmental temperature range from −10° C. to 60° C.

(3) By using the phase-change suppressing heat transfer plate as the evaporator and the condenser, the volume and the weight of the indoor air conditioner and the outdoor air conditioner are reduced. It is convenient to hang the indoor air conditioner and the outdoor air conditioner on the wall, which has a higher safety. Meanwhile, the indoor air conditioner does not require a housing, and the shape thereof can be personalized according to requirements.

BRIEF DESCRIPTION OF THE DRAWINGS

FIGS. 3-8 are structural schematic views of a first phase-change suppressing heat transfer plate in a thermoelectric heat pump air conditioner according to the present invention, wherein FIGS. 3, 5, 7 and 8 are structural schematic views of sections of a first phase-change suppressing heat transfer plate along a longitudinal direction in different examples, FIG. 4 is a sectional view of surfaces of corresponding structures in FIG. 3, and FIG. 6 is a sectional view of surfaces of corresponding structures in FIG. 5.

Figure 1:
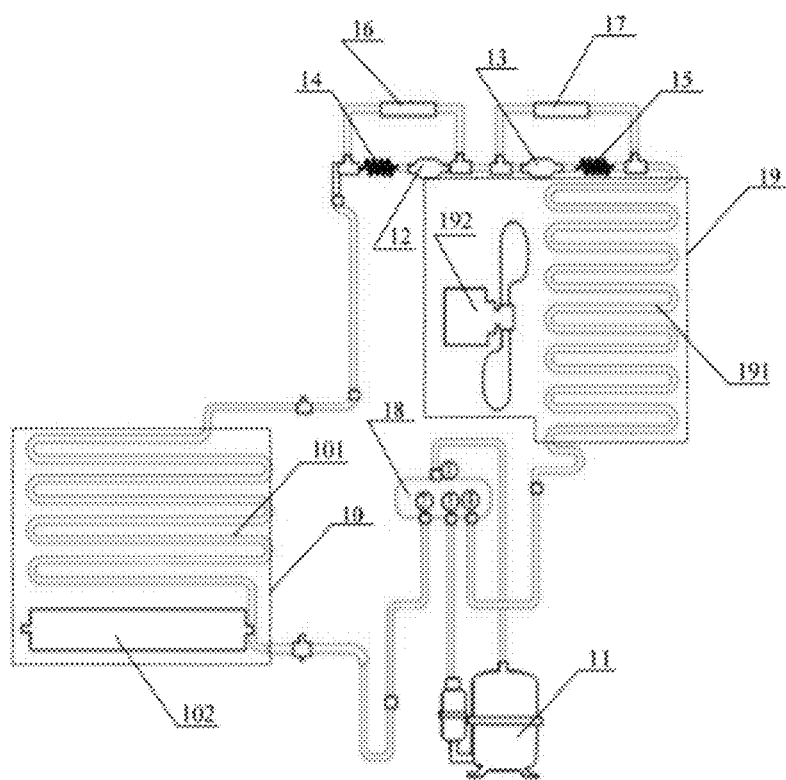
FIG. 1 is a structural schematic view of a heat pump air conditioner in the prior art.

DESCRIPTION OF REFERENCE NUMERALS OF ELEMENTS 10, indoor air conditioner
101, evaporator/condenser
102, cross-flow blower
11, compressor
12, first dryer
13, second dryer
14, first throttle
15, second throttle
16, first one-way valve
17, second one-way valve
18, four-way reversing valve
19, outdoor air conditioner
191, evaporator/condenser
192, axial blower
20, indoor air conditioner
201, first phase-change suppressing heat transfer plate
2011, first plate
2012, second plate
2013, third plate
2014, fourth plate
2015, first projection structure
2016, second projection structure
2017, non-conduit portion
202, first thermally superconducting pipe
2021, first channel
2022, second channel
2023, connection through-hole
2024, filling opening
203, first cooling medium pipe
2031, inlet end of first cooling medium pipe
2032, outlet end of first cooling medium pipe
204, first heat transfer working medium
205, thermoelectric cooling assembly
2051, thermoelectric monomer
20511, T-type thermoelectric element
20512, N-type thermoelectric element
20513, electrode
2052, electrical isolation structure
206, heat exchanger
207, cross-flow blower
21, outdoor air conditioner
211, axial blower
212, second phase-change suppressing heat transfer plate
22, interconnection assembly
221, first throttle
222, second throttle
223, first dryer
224, second dryer
225, first one-way valve
226, second one-way valve
23, four-way reversing valve
24, compressor

DETAILED DESCRIPTION OF THE PREFERRED EMBODIMENTS

Hereinafter, implementations of the present invention will be described through specific examples. Those skilled in the art will easily understand other advantages and functions of the present invention from the disclosure of the description. The present invention may also be implemented or applied by other different embodiments, and various details in the description may also be based on different opinions and applications, and various modifications and changes are made without departing from the spirit of the present invention.

Referring to FIGS. 2 to 10, it needs to be noted that, figures provided in the embodiments are merely used to illustratively describe basic concepts of the present invention, and therefore the figures only illustrate components related to the present invention rather than being drawn according to the numbers, shapes and sizes of the components during an actual implementation. The patterns, numbers and proportions of various components during the actual implementation may be randomly changed and the layout patterns of the components may also be more complicate.

Figure 2:
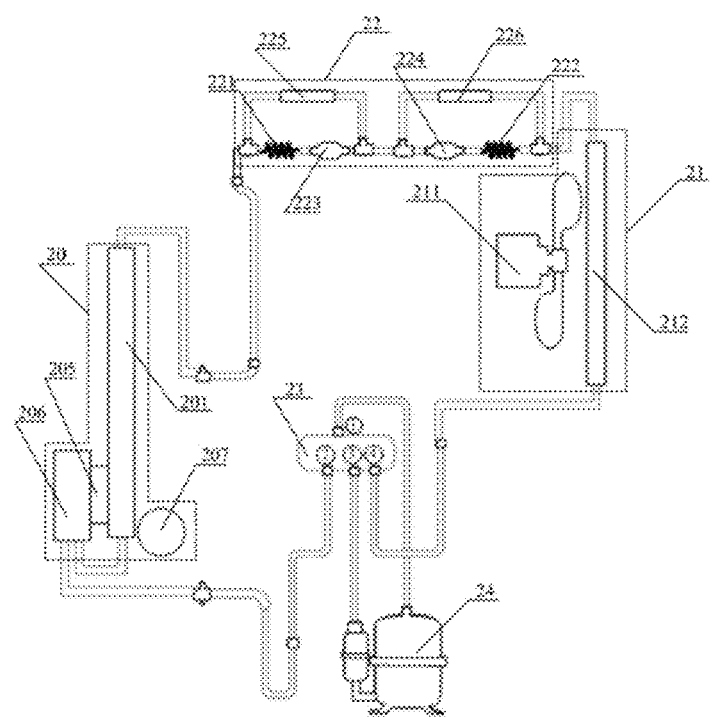
FIG. 2 is a structural schematic view of a thermoelectric heat pump air conditioner according to the present invention.

Referring to FIG. 2, the present invention provides a thermoelectric heat pump air conditioner comprising an indoor air conditioner 20 and an outdoor air conditioner 21. The indoor air conditioner 20 comprises a first phase-change suppressing heat transfer plate 201, a thermoelectric cooling assembly 205 and a heat exchanger 206. A first cooling medium pipe 203 having a certain configuration and a first thermally superconducting pipe 202 having a certain configuration are formed in the first phase-change suppressing heat transfer plate 201. The first thermally superconducting pipe 202 is filled with a first heat transfer working medium 204. One surface of the thermoelectric cooling assembly 205 is attached on a surface of the phase-change suppressing heat transfer plate 201. The heat exchanger 206 is attached on a surface, located away from the phase-change suppressing heat transfer plate 201, of the thermoelectric cooling assembly 205. A second cooling medium pipe (not shown) is formed in the heat exchanger 206, and one end of the second cooling medium pipe being interconnected with the first cooling medium pipe 203.

The outdoor air conditioner 21 comprises a second phase-change suppressing heat transfer plate 212, and a third cooling medium pipe (not shown) having a certain shape and a second thermal superconducting pipe having a certain configuration are formed in the second phase-change suppressing heat transfer plate 212. The second thermally superconducting pipe is filled with a second heat transfer working medium.

As an example, the first heat transfer working medium 204 is a fluid, and preferably, the first heat transfer working medium 204 may be gas, liquid, or a mixture of the gas and the liquid. More preferably, the first heat transfer working medium 204 may be a mixture of the liquid and the gas.

As an example, the first cooling medium pipe 203 and the first thermally superconducting pipe 202, and the third cooling medium pipe and the second thermally superconducting pipe, are formed through an inflation process.

Figure 3:
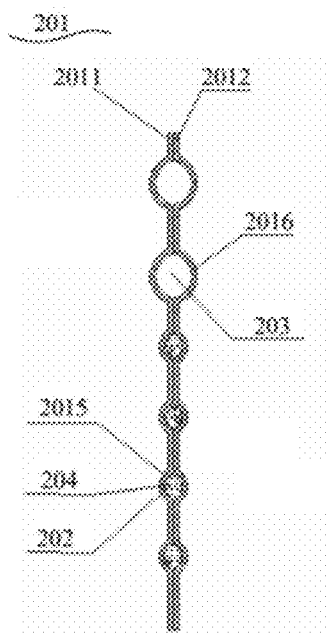

In one example, referring to FIG. 3, the first phase-change suppressing heat transfer plate 201 comprises a first plate 2011 and a second plate 2012 which are composited together through a rolling process. The first thermally superconducting pipe 202 and the first cooling medium pipe 203 are located between the first plate 2011 and the second plate 2012. Surfaces of the first phase-change suppressing heat transfer plate 201 are in a two-sided inflation form. The surfaces of the first plate 2011 and the second plate 2012 are formed with a first projection structure 2015 corresponding to the first thermally superconducting pipe 202 and a second projection structure 2016 corresponding to the first cooling medium pipe 203.

As an example, the surfaces of the first phase-change suppressing heat transfer plate 201 may also be in a single-sided inflation form. The first projection structure 2015 and the second projection structure 2016 may be simultaneously located on the first plate 2011 or simultaneously located on the second plate 2012. When the first projection structure 2015 and the second projection structure 2016 are simultaneously located on the first plate 2011, the surface of the second plate 2012 is a plane. When the first projection structure 2015 and the second projection structure 2016 are simultaneously located on the second plate 2012, the surface of the first plate 2011 is a plane.

As an example, a cross dimension of the first thermally superconducting pipe 202 and a cross dimension of the first cooling medium pipe 203 can be set according to actual requirements. Preferably, in the embodiment, the cross dimension of the first thermally superconducting pipe 202 is smaller than that of the first cooling medium pipe 203.

As an example, a material of the first phase-change suppressing heat transfer plate 201 should be a material having a good thermal conductivity. Preferably, in this embodiment, the material of the first phase-change suppressing heat transfer plate 201 may be copper, copper alloy, aluminum, aluminum alloy, titanium and titanium alloy, or any combination of any one or more of the above-mentioned materials.

As an example, the thickness of the first phase-change suppressing heat transfer plate 201 may be 0.2 mm to 10 mm. The inner diameter of the first thermally superconducting pipe 202 is 0.1 mm to 5 mm.

Figure 4:
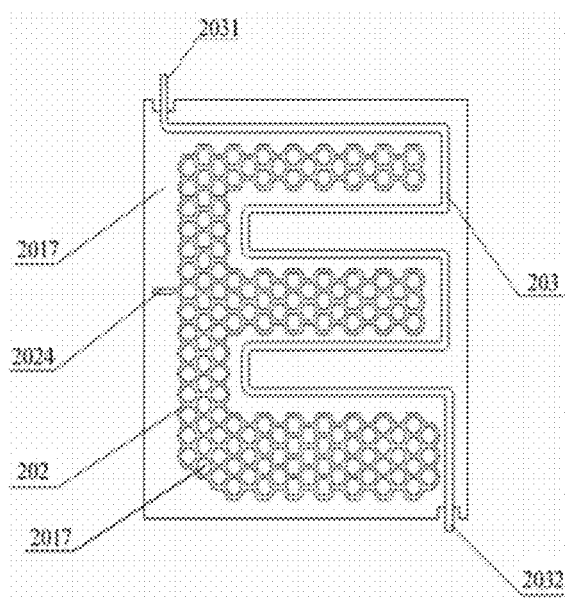

As an example, the first thermally superconducting pipe 202 may be in a hexagonal honeycomb shape, a circular honeycomb shape, a quadrangular honeycomb shape, a plurality of U-shapes that are connected in series, diamonds, triangles and circular ring shapes, or any combination of any one or more of the above shapes. The shape of the first cooling medium pipe 203 may be a single-in-single-out circulation structure, may also be a double-in-double-out circulation structure, and may also be a multiple-in-multiple-out circulation structure, for example, a trinary-in-trinary-out circulation structure, a quadruple-in-quadruple-out circulation structure, a quintuple-in-quintuple-out circulation structure, and may also be a parallel circulation structure. Reference is made to FIG. 4 in which the first thermally superconducting pipe 202 is in a hexagonal honeycomb shape and the shape of the first cooling medium pipe 203 is a single-in-single-out circulation structure. However, the actual structure is not limited thereto. As shown in FIG. 4, an edge portion and a hexagonal portion of the first phase-change suppressing heat transfer plate 201 are a non-conduit portion 2017, and the structures that surround various hexagonal shapes and interconnect with each other are the first thermally superconducting pipe 202. It needs to be noted that since the first thermally superconducting pipe 202 is prepared through the inflation process, a filling opening 2024, i.e., a working medium filling opening, is formed on the first phase-change suppressing heat transfer 201 in the process of forming the first thermally superconducting pipe 202. After the shape of the first thermally superconducting pipe 202 is preliminary formed, the filling opening 2024 is sealed by means of welding so as to realize the sealing of the first thermally superconducting pipe 202, such that the first thermally superconducting pipe 202 is not conducted with outside. FIG. 4 simultaneously shows an inlet end 2031 of the first cooling medium pipe and an outlet end 2032 of the first cooling medium pipe at two ends of the first cooling medium pipe 203.

Figure 5:
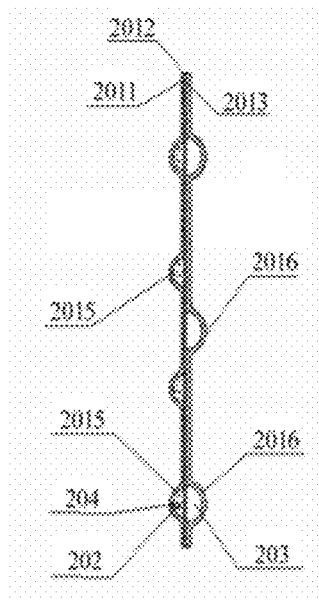

In another example, referring to FIG. 5, the first phase-change suppressing heat transfer plate 201 comprises the first plate 2011, the second plate 2012 and a third plate 2013 which are successively stacked. The first plate 2011 and the third plate 2013 are located on two sides of the second plate 2012 respectively and are composited with the second plate 2012 through the rolling process. The first thermally superconducting pipe 202 is located between the first plate 2011 and the second plate 2012. The surface of the first plate 2011 is formed with the first projection structure 2015 corresponding to the first thermally superconducting pipe 202. The first cooling medium pipe 203 is formed between the second plate 2012 and the third plate 2013. A surface of the third plate 2013 is formed with the second projection structure 2016 corresponding to the first cooling medium pipe 203.

As an example, a cross dimension of the first thermally superconducting pipe 202 and a cross dimension of the first cooling medium pipe 203 can be set according to actual requirements. Preferably, in the embodiment, the cross dimension of the first thermally superconducting pipe 202 is smaller than that of the first cooling medium pipe 203.

As an example, a material of the first phase-change suppressing heat transfer plate 201 should be a material having good thermal conductivity. Preferably, in the embodiment, the material of the first phase-change suppressing heat transfer plate 201 may be copper, copper alloy, aluminum, aluminum alloy, titanium and titanium alloy, or any combination of any one or more of the above-mentioned materials.

As an example, a thickness of the first phase-change suppressing heat transfer plate 201 may be 0.2 mm to 10 mm, and an inner diameter of the first thermally superconducting pipe 202 is 0.1 mm to 5 mm.

Figure 6:
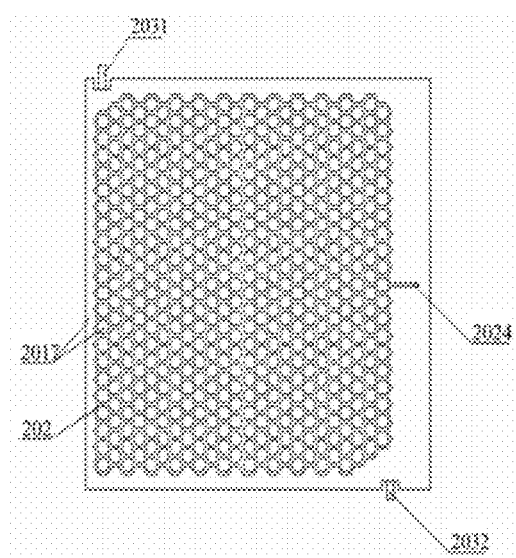

As an example, the first thermally superconducting pipe 202 may be in a hexagonal honeycomb shape, a circular honeycomb shape, a quadrangular honeycomb shape, a plurality of U-shapes that are connected in series, diamonds, triangles and circular ring shapes, or any combination of any one or more of the above shapes. The shape of the first cooling medium pipe 203 may be a single-in-single-out circulation structure, may also be a double-in-double-out circulation structure, and may also be a multiple-in-multiple-out circulation structure, for example, a trinary-in-trinary-out circulation structure, a quadruple-in-quadruple-out circulation structure, a quintuple-in-quintuple-out circulation structure, and may also be a parallel circulation structure. Reference is made to FIG. 6 in which the first thermally superconducting pipe 202 is in a hexagonal honeycomb shape. However, the actual structure is not limited thereto. As shown in FIG. 6, an edge portion and a hexagonal portion of the first phase-change suppressing heat transfer plate 201 are a non-conduit portion 2017, and the structures that surround various hexagonal shapes and interconnect with each other are the first thermally superconducting pipe 202. It needs to be noted that since the first thermally superconducting pipe 202 is prepared through the inflation process, a filling opening 2024, i.e., a working medium filling opening, is formed on the first phase-change suppressing heat transfer 201 in the process of forming the first thermally superconducting pipe 202. After the shape of the first thermally superconducting pipe 202 is preliminary formed, the filling opening 2024 is sealed by means of welding so as to realize sealing of the first thermally superconducting pipe 202, such that the first thermally superconducting pipe 202 is not conducted with outside. FIG. 6 simultaneously shows an inlet end 2031 of the first cooling medium pipe and an outlet end 2032 of the first cooling medium pipe at two ends of the first cooling medium pipe 203.

Figure 7:
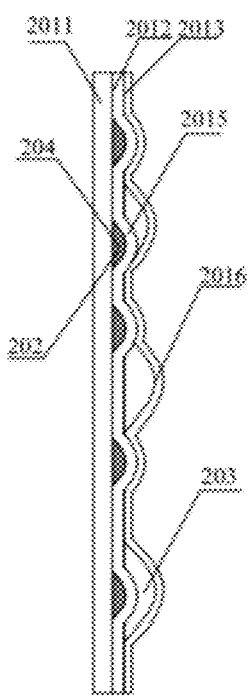

In another example, referring to FIG. 7, the first phase-change suppressing heat transfer plate 201 comprises the first plate 2011, the second plate 2012 and a third plate 2013 which are successively stacked. The first plate 2011 and the third plate 2013 are located on two sides of the second plate 2012 respectively and are composited with the second plate 2012 through the rolling process. The first thermally superconducting pipe 202 is located between the first plate 2011 and the second plate 2012, and the surface of the first plate 2011 is a plane. The surface of the second plate 2012 is formed with the first projection structure 2015 corresponding to the first thermally superconducting pipe 202. The first cooling medium pipe 203 is formed between the second plate 2012 and the third plate 2013. A surface of the third plate 2013 is formed with the second projection structure 2016 corresponding to the first cooling medium pipe 203.

As an example, a cross dimension of the first thermal superconducting pipe 202 and a cross dimension of the first cooling medium pipe 203 can be set according to actual requirements. Preferably, in the embodiment, the cross dimension of the first thermally superconducting pipe 202 is smaller than the cross dimension of the first cooling medium pipe 203.

As an example, a material of the first phase-change suppressing heat transfer plate 201 should be a material having good thermal conductivity. Preferably, in the embodiment, the material of the first phase-change suppressing heat transfer plate 201 may be copper, copper alloy, aluminum, aluminum alloy, titanium and titanium alloy, or any combination of any one or more of the above-mentioned materials.

As an example, a thickness of the first phase-change suppressing heat transfer plate 201 may be 0.2 mm to 10 mm, and an inner diameter of the first thermally superconducting pipe 202 is 0.1 mm to 5 mm.

As an example, the first thermally superconducting pipe 202 may be in a hexagonal honeycomb shape, a circular honeycomb shape, a quadrangular honeycomb shape, a plurality of U-shapes that are connected in series, diamonds, triangles and circular ring shapes, or any combination of any one or more of the above shapes. The shape of the first cooling medium pipe 203 may be a single-in-single-out circulation structure, may also be a double-in-double-out circulation structure, and may also be a multiple-in-multiple-out circulation structure, for example, a trinary-in-trinary-out circulation structure, a quadruple-in-quadruple-out circulation structure, a quintuple-in-quintuple-out circulation structure, and may also be a parallel circulation structure.

Figure 8:
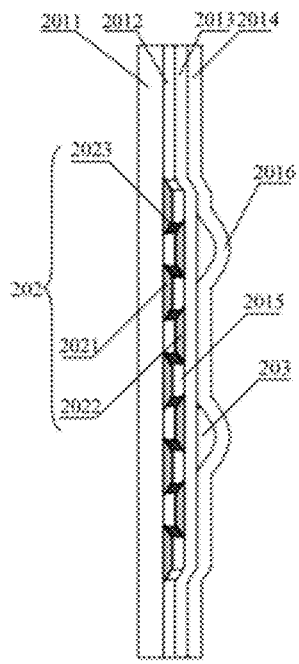

In another example, referring to FIG. 8, the first phase-change suppressing heat transfer plate 201 comprises the first plate 2011, the second plate 2012, the third plate 2013 and a fourth plate 2014 which are successively stacked. The first plate 2011, the second plate 2012, the third plate 2013 and the fourth plate 2014 are composited together through the rolling process. The third plate 2013 comprises a projection area, and a surface of projection area is a plane. The first thermally superconducting pipe 202 is located between the first plate 2011 and the third plate 2013, and an area in which the first thermally superconducting pipe 202 is distributed corresponds to the projection area. The first cooling medium pipe 203 is located between the third plate 2013 and the fourth plate 2014, and an area in which the first cooling medium pipe 203 is distributed corresponds to the projection area.

As an example, the first thermally superconducting pipe 202 comprises several first channels 2021, second channels 2022, and connection through-holes 2023. The first channel 2021 is located between the first plate 2011 and the second plate 2012, and the second channel 2022 is located between the second plate 2012 and the third plate 2013. The connection through-hole 2023 penetrates through the second plate 2012 and enables the adjacent first and second channels 2021 and 2022 to be interconnected with each other. The surface of the second plate 2012 is formed with the first projection structure 2015 corresponding to the first channel 2021 and the second channel 2022. A surface of the fourth plate 2014 is formed with the second project structure 2016 corresponding to the first cooling medium pipe 203.

As an example, two adjacent first channels 2021 and two adjacent second channels 2022 are separated from each other. The first channel 2021 and the second channel 2022 are staggered in parallel. That is, the first channels 2021 located between the first plate 2011 and the second plate 2012 are not interconnected with each other, and the second channels 2022 located between the second plate 2011 and the third plate 2013 are not interconnected with each other.

As an example, the connection through-hole 2023 is located at two ends of the first channel 2021 and the second channel 2022 and enables the adjacent first and second channels 2021 and 2022 to be interconnected with each other.

As an example, the cross-sectional shapes of the first channel 2021 and the second channel 2022 may be, but not limited to, a trapezoid. The lengthwise cross-sectional shapes of the first channel 2021 and the second channel 2022 may be, but not limited to, a rectangle. The shape of the connection through-hole may be, but not limited to, a circle or an ellipsoid.

As an example, a material of the first phase-change suppressing heat transfer plate 201 should be a material having good thermal conductivity. Preferably, in the embodiment, the material of the first phase-change suppressing heat transfer plate 201 may be copper, copper alloy, aluminum, aluminum alloy, titanium and titanium alloy, or any combination of any one or more of the above-mentioned materials.

As an example, a thickness of the first phase-change suppressing heat transfer plate 201 may be 0.2 mm to 10 mm, and an inner diameter of the first thermally superconducting pipe 202 is 0.1 mm to 5 mm.

As an example, the shape of the first cooling medium pipe 203 may be a single-in-single-out circulation structure, may also be a double-in-double-out circulation structure, and may also be a multiple-in-multiple-out circulation structure, for example, a trinary-in-trinary-out circulation structure, a quadruple-in-quadruple-out circulation structure, a quintuple-in-quintuple-out circulation structure, and may also be a parallel circulation structure.

It needs to be noted that, the structure and material of the second phase-change suppressing heat transfer plate 212 is substantially the same as the structure and material of the first phase-change suppressing heat transfer plate 201 as shown in FIGS. 3 to 8, wherein reference can be made to the shape and structure features of the first cooling medium pipe 203 in the first phase-change suppressing heat transfer plate 201 for the shape and structure features of the third cooling medium pipe in the second phase-change suppressing heat transfer plate 212. However, in the same example, the shape of the third cooling medium pipe may be the same as or different from the shape of the first cooling medium pipe 203. That is, the shape of the third cooling medium pipe may be the same as the shape of the first cooling medium 203, i.e., the shape of the third cooling medium pipe may be a single-in-single-out circulation structure, may also be a double-in-double-out circulation structure, and may also be a multiple-in-multiple-out circulation structure, for example, a trinary-in-trinary-out circulation structure, a quadruple-in-quadruple-out circulation structure, a quintuple-in-quintuple-out circulation structure, and may also be a parallel circulation structure. However, in the same example, the specific shapes of the third cooling medium pipe and the first cooling medium 203 may be the same type in the above-mentioned multiple shapes and structures and may also be two different types. Reference can be made to the shape and structure features of the first thermally superconducting pipe 202 in the first phase-change suppressing heat transfer plate 201 for the shape and structure features of the second thermally superconducting pipe in the second phase-change suppressing heat transfer plate 212. However, in the same example, the shape of the second thermally superconducting pipe may be the same as or different from the shape of the first thermally superconducting pipe. For specific structures and features of the second phase-change suppressing heat transfer plate 212, please refer to FIGS. 3 to 8 and related descriptions of the first phase-change suppressing heat transfer plate 201, and repeated descriptions are not provided herein.

It needs to be further noted that, the first cooling medium pipe 203, the second cooling medium pipe and the third cooling medium pipe are filled with the same cooling medium. The second thermally superconducting pipe and the first thermally superconducting pipe 202 are pipes that are independent and are not interconnected with each other. The second heat transfer working medium filled in the second thermally superconducting pipe may be the same as or different from the first heat transfer working medium filled in the first thermally superconducting pipe 202.

As an example, a surface of an attachment portion between the first phase-change suppressing heat transfer plate 201 and the thermoelectric cooling assembly 205 has a plane shape, and a surface of other portions of the first phase-change suppressing heat transfer plate 201 is formed with a hole, a shallow groove, a projection, a loose-leaf window or a coverage coating for enhancing heat transfer.

As an example, the number of the thermoelectric cooling assembly 205 is one or more, and a plurality of the thermoelectric cooling assemblies 205 are connected in series, in parallel, in parallel-series or in series-parallel.

Figure 9:
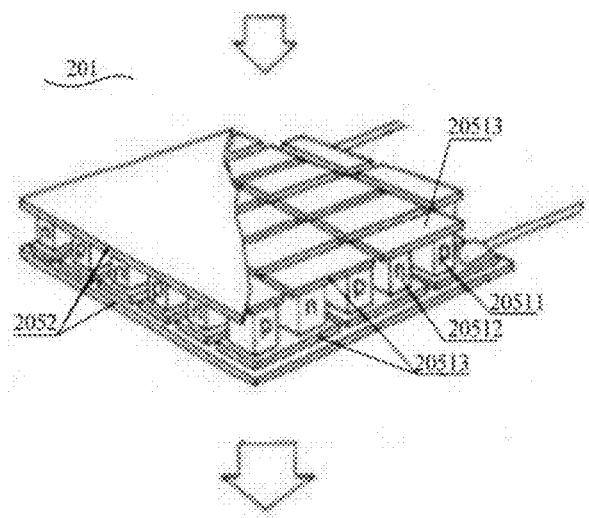
FIG. 9 is a three-dimensional structural schematic view of a thermoelectric cooling assembly in a thermoelectric heat pump air conditioner according to the present invention.
Figure 10:
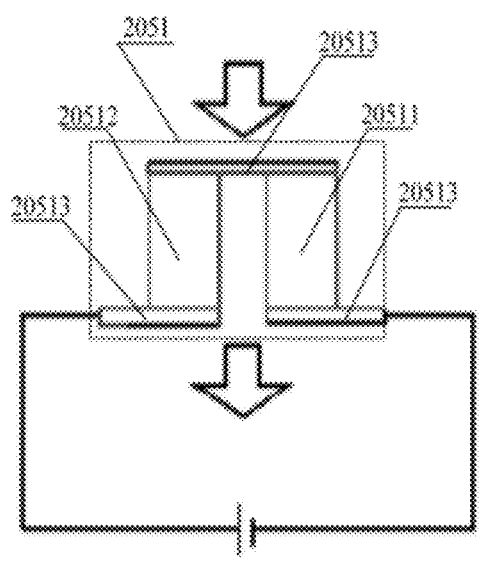
FIG. 10 is a structural schematic view of a thermoelectric monomer in a thermoelectric cooling assembly in a thermoelectric heat pump air conditioner according to the present invention.

As an example, referring to FIGS. 9 and 10, the thermoelectric cooling assembly 205 comprises a plurality of thermoelectric monomers 2051, and each of the thermoelectric monomers 2051 comprises a P-type thermoelectric element 20511 and an N-type thermoelectric element 20512 which are arranged in a parallel spaced apart manner. Each of the P-type thermoelectric element 20511 and the N-type thermoelectric element 20512 comprises a first end surface and a second end surface. The first end surface of the P-type thermoelectric element 20511 and the first end surface of the N-type thermoelectric element 20512 are connected by an electrode 20513. The second end surface of the P-type thermoelectric element 20511 and the second end surface of the N-type thermoelectric element 20512 in the thermoelectric monomer 2051 located at an adjacent side of the second end surface of the P-type thermoelectric element 20511 are connected by the electrode 20513. The second end surface of the N-type thermoelectric element 20512 and the second end surface of the P-type thermoelectric element 20511 in the thermoelectric monomer 2051 located at an adjacent side of the second end surface of the N-type thermoelectric element 20512 are connected by the electrode 20513. By combining a plurality of the thermoelectric monomers 2051, a larger output voltage and a larger output electrical power can be obtained.

As an example, the thermoelectric cooling assembly 205 further comprises an electrical isolation structure 2052 which is respectively attached on an outer side of the electrode 20513 located on the first end surfaces of the P-type thermoelectric element 20511 and the N-type thermoelectric element 20512 and an outer side of the electrode 20513 located on the second end surfaces of the P-type thermoelectric element 20511 and the N-type thermoelectric element 20512.

As an example, the electrical isolation structure 2052 may be, but not limited to, a ceramic sheet or a mica sheet.

As an example, materials of the P-type thermoelectric element 20511 and the N-type thermoelectric element 20512 are doped pseudobinary bismuth telluride and solid solution thereof, and pseudoternary bismuth telluride and solid solution thereof.

As an example, exposed outer surfaces of the thermoelectric cooling assembly 205 and the heat exchanger 206 are covered with a heat-insulating material layer (not shown) to prevent heat leakage losses and a thermal short circuit with the first phase-change suppressing heat transfer plate 201.

As an example, the indoor air conditioner 20 further comprises a cross-flow blower 207. The cross-flow blower 207 is located at a side, opposite to or adjacent to one side at which the thermoelectric cooling assembly 205 is installed, of the first phase-change suppressing heat transfer plate 201. That is, the cross-flow blower 207 may be located at a side, away from the thermoelectric cooling assembly 205, of the first phase-change suppressing heat transfer plate 201, or may be located at upper and lower ends of the first phase-change suppressing heat transfer plate 201.

Continuing to refer to FIG. 1, the outdoor air conditioner 21 further comprises an axial blower 211, and the axial blower 211 is located at one side of the phase-change suppressing heat transfer plate 201 in the outdoor air conditioner 21.

As an example, the thermoelectric heat pump air conditioner further comprises a interconnection assembly 22, a four-way reversing valve 23 and a compressor 24. The interconnection assembly 22 is located between the indoor air conditioner 20 and the outdoor air conditioner 21 with one end being interconnected with another end of the first cooling medium pipe 203 in the indoor air conditioner 20 and another end being interconnected with one end of the third cooling medium pipe in the outdoor air conditioner 21. The four-way reversing valve 23 comprises four connection ends (1), (2), (3) and (4). The connection ends (1) and (3) are connected with the compressor 24. The connection end (2) is connected with another end of the second cooling medium pipe in the heat exchanger 206. The connection end (4) is connected with another end of the third cooling medium pipe in the outdoor air conditioner 21.

As an example, the interconnection assembly 22 comprises a first throttle 221, a second throttle 222, a first dryer 223, a second dryer 224, a first one-way valve 225 and a second one-way valve 226. The first throttle 221, the first dryer 223, the second dryer 224, and the second throttle 222 are sequentially connected in series. One end of the first throttle 221 away from the first dryer 223 is interconnected with another end of the first cooling medium pipe 203 in the indoor air conditioner 20. One end of the second throttle 222 away from the second dryer 224 is interconnected with one end of the third cooling medium pipe in the outdoor air conditioner 21. One end of the first one-way valve 225 is interconnected with one end of the first throttle 221 away from the first dryer 223, and another end is interconnected with one end of the first dryer 223 away from the first throttle 221. One end of the second one-way valve 226 is interconnected with one end of the second dryer 222 away from the second throttle 224, and another end is interconnected with one end of the second throttle 222 away from the second dryer 224.

It needs to be noted that, all of the elements that are needed to be interconnected, such as the first phase-change suppressing heat transfer plate 201, the first throttle 221, the second throttle 222, the first dryer 223, the second dryer 224, the first one-way valve 225 and the second one-way valve 226 in the indoor air conditioner 20 as well as the second phase-change suppressing heat transfer plate 212, the four-way reversing valve, the compressor and the heat exchanger 206 in the outdoor air conditioner 21, are interconnected with each other through pipes.

The operating mode of the thermoelectric heat pump air conditioner according to the present invention is substantially the same as the operating mode of the traditional heat pump air conditioner. The thermoelectric heat pump air conditioner differs from the traditional heat pump air conditioner in that: the indoor air conditioner 20 of the thermoelectric heat pump air conditioner comprises the first phase-change suppressing heat transfer plate 201, the thermoelectric cooling assembly 205, the heat exchanger 206 and the cross-flow blower 207; and the outdoor air conditioner 21 comprises the second phase-change suppressing heat transfer plate 212 and the axial blower 211. Since an adiabatic process is performed for the thermoelectric cooling assembly 205 and the heat exchanger 206, normal operation thereof would not be influenced. The operating principles of the thermoelectric heat pump air conditioner according to the present invention are as follows.

In the case of a cooling mode, when the environmental temperature is between 25° C. to 45° C., the thermoelectric cooling assembly 205 is not activated. When the environmental temperature reaches and exceeds 45° C., the thermoelectric cooling assembly 205 is powered on to a cooling operation mode. At this time, cold produced by the compressor 24 is brought into the first phase-change suppressing heat transfer plate 201 of the indoor air conditioner 20 sequentially through the refrigerant (i.e., the cooling medium) and the heat exchanger 206 via the pipes. The thermoelectric cooling assembly 205 is pressed against one end of the first phase-change suppressing heat transfer plate 201 and directly transfers the produced cold thereof to the first phase-change suppressing heat transfer plate 201, which increases a cooling capacity on the basis of the cooling capacity of the compressor 24. Two streams of cold produced by the thermoelectric cooling assembly 205 and the compressor 24 are transferred quickly and evenly by the first heat transfer working medium 204 of the first thermal superconducting pipe 202 in the first phase-change suppressing heat transfer plate 201, and are dispersed into the room through the cross-flow blower 207 by means of a forced convection. At this time, heat produced by the compressor 24 is brought into the second phase-change suppressing heat transfer plate 212 of the outdoor air conditioner 21 through the pipes via the refrigerant, and is transferred quickly and evenly by the second heat transfer working medium of the second thermal superconducting pipe in the second phase-change suppressing heat transfer plate 212, and is dispersed to the outside through the axial blower 211 by means of the forced convection.

In the case of a heating mode, when the environmental temperature is between 10° C. to 25° C., the thermoelectric cooling assembly is not activated. When the environmental temperature decreases to 10° C., the thermoelectric cooling assembly 205 is powered on to a heating operation mode, and heat produced by the compressor 24 is brought into the first phase-change suppressing heat transfer plate 201 of the indoor air conditioner 20 sequentially through the refrigerant (i.e., the cooling medium) and the heat exchanger 206 via the pipes. The thermoelectric cooling assembly 205 is pressed against one end of the first phase-change suppressing heat transfer plate 201 and directly transfers the produced heat thereof to the first phase-change suppressing heat transfer plate 201, which increases a heating capacity on the basis of the heating capacity of the compressor 24. Two streams of heat produced by the compressor 24 are transferred quickly and evenly by the first heat transfer working medium 204 of the first thermal superconducting pipe 202 in the first phase-change suppressing heat transfer plate 201, and are dispersed into the room through the cross-flow blower 207 by means of a forced convection. At this time, cold produced by the compressor 24 is brought into the second phase-change suppressing heat transfer plate 212 of the outdoor air conditioner 21 through the pipes via the refrigerant, and is transferred quickly and evenly by the second heat transfer working medium of the second thermal superconducting pipe in the second phase-change suppressing heat transfer plate 212, and outside heat is absorbed for heating through the axial blower 211 by means of the forced convection.

To sum up, the present invention provides a thermoelectric heat pump air conditioner comprising the indoor air conditioner and the outdoor air conditioner. The indoor air conditioner comprises the first phase-change suppressing heat transfer plate, the thermoelectric cooling assembly and the heat exchanger. The first cooling medium pipe having a certain configuration and the first thermally superconducting pipe having a certain configuration are formed in the first phase-change suppressing heat transfer plate. The first thermally superconducting pipe is filled with the first heat transfer working medium. One face of the thermoelectric cooling assembly is attached on the surface of the phase-change suppressing heat transfer plate. The heat exchanger is attached on the surface, away from the phase-change suppressing heat transfer plate, of the thermoelectric cooling assembly. The second cooling medium pipe is formed in the heat exchanger. One end of the second cooling medium pipe being interconnected with one end of the first cooling medium pipe. The outdoor air conditioner comprises the second phase-change suppressing heat transfer plate, the third cooling medium pipe having a certain shape and the second thermally superconducting pipe having a certain configuration are formed in the second phase-change suppressing heat transfer plate. The second thermally superconducting pipe is filled with the second heat transfer working medium. In the thermoelectric heat pump air conditioner according to the present invention, the thermoelectric cooling assembly is used as an auxiliary heat pump, and the range of a temperature environment in which the thermoelectric heat pump air conditioner can normally operate can be increased from −10° C. to 60° C. A higher coefficient of performance is realized during operation under a high temperature and a low temperature. By using the phase-change suppressing heat transfer plate as an evaporator and a condenser, the heat transfer efficiency is high, and the thermoelectric heat pump air conditioner has a higher coefficient of performance within the expanded environmental temperature range of −10° C. to 60° C. By using the phase-change suppressing heat transfer plate as the evaporator and the condenser, the volume and the weight of the indoor air conditioner and the outdoor air conditioner are reduced. It is convenient to hang the indoor air conditioner and the outdoor air conditioner on the wall, which has a higher safety. Meanwhile, the indoor air conditioner does not require a housing, and the shape thereof can be personalized according to requirements.

The above-described embodiment is merely used to illustratively describe the principle and function of the present invention and is not used to limit the present invention. Any person skilled in the art may make modifications or changes to the above-described embodiment without departing from the spirit and scope of the present invention. Hence, all equivalent modifications and changes made by those skilled in the art without departing from the spirit and technical concept of the present invention shall be included by the claims of the present invention.

What is claimed is:

1. A thermoelectric heat pump air conditioner comprising:
an indoor air conditioner and an outdoor air conditioner;
the indoor air conditioner comprises a first phase-change suppressing heat transfer plate, a thermoelectric cooler and a heat exchanger; a first cooling medium pipe having a certain configuration and a first thermally superconducting pipe having a certain configuration are formed in the first phase-change suppressing heat transfer plate; the first thermally superconducting pipe is filled with a first heat transfer working medium; one surface of the thermoelectric cooler is attached on a surface of the phase-change suppressing heat transfer plate; the heat exchanger is attached on a surface, away from the phase-change suppressing heat transfer plate, of the thermoelectric cooler; a second cooling medium pipe is formed in the heat exchanger; and one end of the second cooling medium pipe being interconnected with the first cooling medium pipe;
the outdoor air conditioner comprises a second phase-change suppressing heat transfer plate; a third cooling medium pipe having a certain shape and a second thermally superconducting pipe having a certain configuration are formed in the second phase-change suppressing heat transfer plate; and the second thermally superconducting pipe is filled with a second heat transfer working medium;
the first thermally superconducting pipe, the second thermally superconducting pipe, the first cooling medium pipe and the third cooling medium pipe are formed through an inflation process; each of the first phase-change suppressing heat transfer plate and the second phase-change suppressing heat transfer plate comprises a first plate, a second plate and a third plate which are successively stacked; the first plate and the third plate are located on the two sides of the second plate respectively and are composited with the second plate through the rolling process;
the first thermally superconducting pipe or the second thermally superconducting pipe is located between the first plate and the second plate; an outer surface of the first plate is a plane; the surface of the second plate is formed with a first projection structure corresponding to the first thermally superconducting pipe or the second thermally superconducting pipe; and
the first cooling medium pipe or the third cooling medium pipe is formed between the second plate and the third plate; and the surface of the third plate is formed with a second projection structure corresponding to the first cooling medium pipe or the third cooling medium pipe.

2. The thermoelectric heat pump air conditioner of claim 1, wherein each of the first phase-change suppressing heat transfer plate and the second phase-change suppressing heat transfer plate comprises the first plate and the second plate which are composited together through a rolling process;
the first thermally superconducting pipe and the first cooling medium pipe, or the second thermally superconducting pipe and the third cooling medium pipe are located between the first plate and the second plate; a surface of the first plate, a surface of the second plate, or the surfaces of the first plate and the second plate are formed with the first projection structure corresponding to the first thermally superconducting pipe or the second thermally superconducting pipe, and the second projection structure corresponding to the first cooling medium pipe or the third cooling medium pipe.

3. The thermoelectric heat pump air conditioner of claim 1, wherein the first cooling medium pipe or the third cooling medium pipe is formed between the second plate and the third plate; and a surface of the third plate is formed with the second projection structure corresponding to the first cooling medium pipe or the third cooling medium pipe.

4. A thermoelectric heat pump air conditioner comprising:
an indoor air conditioner and an outdoor air conditioner;
the indoor air conditioner comprises a first phase-change suppressing heat transfer plate, a thermoelectric cooler and a heat exchanger; a first cooling medium pipe having a certain configuration and a first thermally superconducting pipe having a certain configuration are formed in the first phase-change suppressing heat transfer plate; the first thermally superconducting pipe is filled with a first heat transfer working medium; one surface of the thermoelectric cooler is attached on a surface of the phase-change suppressing heat transfer plate; the heat exchanger is attached on a surface, away from the phase-change suppressing heat transfer plate, of the thermoelectric cooler; a second cooling medium pipe is formed in the heat exchanger; and one end of the second cooling medium pipe being interconnected with the first cooling medium pipe;
the outdoor air conditioner comprises a second phase-change suppressing heat transfer plate; a third cooling medium pipe having a certain shape and a second thermally superconducting pipe having a certain configuration are formed in the second phase-change suppressing heat transfer plate; and the second thermally superconducting pipe is filled with a second heat transfer working medium;
the first thermally superconducting pipe, the second thermally superconducting pipe, the first cooling medium pipe and the third cooling medium pipe are formed through an inflation process; each of the first phase-change suppressing heat transfer plate and the second phase-change suppressing heat transfer plate comprises a first plate, the second plate, a third plate and a fourth plate which are successively stacked; the first plate, the second plate, the third plate and the fourth plate are composited together through the rolling process;
the third plate comprises a projection area, and a surface of the projection area is a plane;
the first thermally superconducting pipe or the second thermally superconducting pipe is located between the first plate and the third plate; and an area in which the first thermally superconducting pipe or the second thermally superconducting pipe is distributed corresponds to the projection area;
the first cooling medium pipe or the third cooling medium pipe is located between the third plate and the fourth plate; and an area in which the first cooling medium pipe or the third cooling medium pipe is distributed corresponds to the projection area.

5. The thermoelectric heat pump air conditioner of claim 4, wherein each of the first thermally superconducting pipe and the second thermally superconducting pipe comprises a plurality of first channels, second channels, and connection through-holes;
the first channel is located between the first plate and the second plate; the second channel is located between the second plate and the third plate; the connection through-hole penetrates through the second plate and enables the adjacent first and second channels to be interconnected with each other; and
the surface of the second plate is formed with a first projection means corresponding to the first channel and the second channel; and a surface of the fourth plate is formed with a second project means corresponding to the first cooling medium pipe or the third cooling medium pipe.

6. The thermoelectric heat pump air conditioner of claim 5, wherein both two adjacent first channels and two adjacent second channels are separated from each other respectively; and the first channel and the second channel are staggered in parallel; and
the connection through-hole is located at two ends of the first channel and the second channel, and enables two ends of the adjacent first and second channels to be interconnected with each other.

7. The thermoelectric heat pump air conditioner of claim 6, wherein the cross-sectional shapes of the first channel and the second channel are a trapezoid; the longitudinal section shapes of the first channel and the second channel are a rectangle; and the shape of the connection through-hole is a circle or an ellipsoid.

8. The thermoelectric heat pump air conditioner of claim 1, wherein the first thermally superconducting pipe or the second thermally superconducting pipe is in a hexagonal honeycomb shape, a circular honeycomb shape, a quadrangular honeycomb shape, a plurality of U-shapes that are connected in series, diamonds, triangles and circular ring shapes, or any combination of any one or more of the above shapes.

9. The thermoelectric heat pump air conditioner of claim 1, wherein a surface of an attachment portion between the first phase-change suppressing heat transfer plate and the thermoelectric cooler has a plane shape; and a surface of other portions of the first phase-change suppressing heat transfer plate is formed with a hole, a shallow groove, a projection, a loose-leaf window or a coverage coating for enhancing heat transfer.

10. The thermoelectric heat pump air conditioner of claim 1, wherein the number of the thermoelectric cooler is one or more; and a plurality of the thermoelectric cooling assemblies are connected in series, in parallel, in parallel-series or in series-parallel.

11. The thermoelectric heat pump air conditioner of claim 1, wherein the thermoelectric cooler comprises a plurality of thermoelectric monomers; each of the thermoelectric monomers comprises a P-type thermoelectric element and an N-type thermoelectric element which are arranged in a parallel spaced apart manner; each of the P-type thermoelectric element and the N-type thermoelectric element comprise a first end surface and a second end surface; the first end surface of the P-type thermoelectric element and the first end surface of the N-type thermoelectric element are connected by an electrode; the second end surface of the P-type thermoelectric element and the second end surface of the N-type thermoelectric element in the thermoelectric monomer located at an adjacent side of the second end surface of the P-type thermoelectric element are connected by an electrode; and the second end surface of the N-type thermoelectric element and the second end surface of the P-type thermoelectric element in the thermoelectric monomer located at an adjacent side of the second end surface of the N-type thermoelectric element are connected by an electrode.

12. The thermoelectric heat pump air conditioner of claim 11, wherein the thermoelectric cooler further comprises an electrical isolation means which is respectively attached on an outer side of the electrode located on the first end surfaces of the P-type thermoelectric element and the N-type thermoelectric element, and attached on an outer side of the electrode located on the second end surfaces of the P-type thermoelectric element and the N-type thermoelectric element.

13. The thermoelectric heat pump air conditioner of claim 11, wherein materials of the P-type thermoelectric element and the N-type thermoelectric element are doped pseudobinary bismuth telluride and solid solution thereof, and pseudoternary bismuth telluride and solid solution thereof.

14. The thermoelectric heat pump air conditioner of claim 1, wherein exposed outer surfaces of the thermoelectric cooler and the heat exchanger are covered with a heat-insulating material layer.

15. The thermoelectric heat pump air conditioner of claim 1, wherein the indoor air conditioner further comprises a cross-flow blower; and the cross-flow blower is located at a side, of the first phase-change suppressing heat transfer plate, opposite to or adjacent to one side at which the thermoelectric cooler is installed.

16. The thermoelectric heat pump air conditioner of claim 1, wherein the outdoor air conditioner further comprises an axial blower, and the axial blower is located at one side of the phase-change suppressing heat transfer plate in the outdoor air conditioner.

17. The thermoelectric heat pump air conditioner of claim 16, wherein the thermoelectric heat pump air conditioner further comprises a interconnection assembly, a four-way reversing valve and a compressor;
the interconnection assembly is located between the indoor air conditioner and the outdoor air conditioner with one end being in communication with another end of the first cooling medium pipe in the indoor air conditioner and another end being interconnected with one end of the first cooling medium pipe in the outdoor air conditioner; and
the four-way reversing valve is connected with another end of the second cooling medium pipe in the heat exchanger, the compressor and another end of the first cooling medium pipe in the outdoor air conditioner.

18. The thermoelectric heat pump air conditioner of claim 17, wherein the communication assembly comprises a first throttle, a second throttle, a first dryer, a second dryer, a first one-way valve and a second one-way valve;
the first throttle, the first dryer, the second dryer, and the second throttle are sequentially connected in series; one end of the first throttle away from the first dryer is interconnected with another end of the first cooling medium pipe in the indoor air conditioner; one end of the second throttle away from the second dryer is interconnected with one end of the first cooling medium pipe in the outdoor air conditioner; and
one end of the first one-way valve is interconnected with one end of the first throttle away from the first dryer and another end is interconnected with one end of the first dryer away from the first throttle; one end of the second one-way valve is interconnected with one end of the second dryer away from the second throttle and another end is interconnected with one end of the second throttle away from the second dryer.

* * * * *